Figure 1:
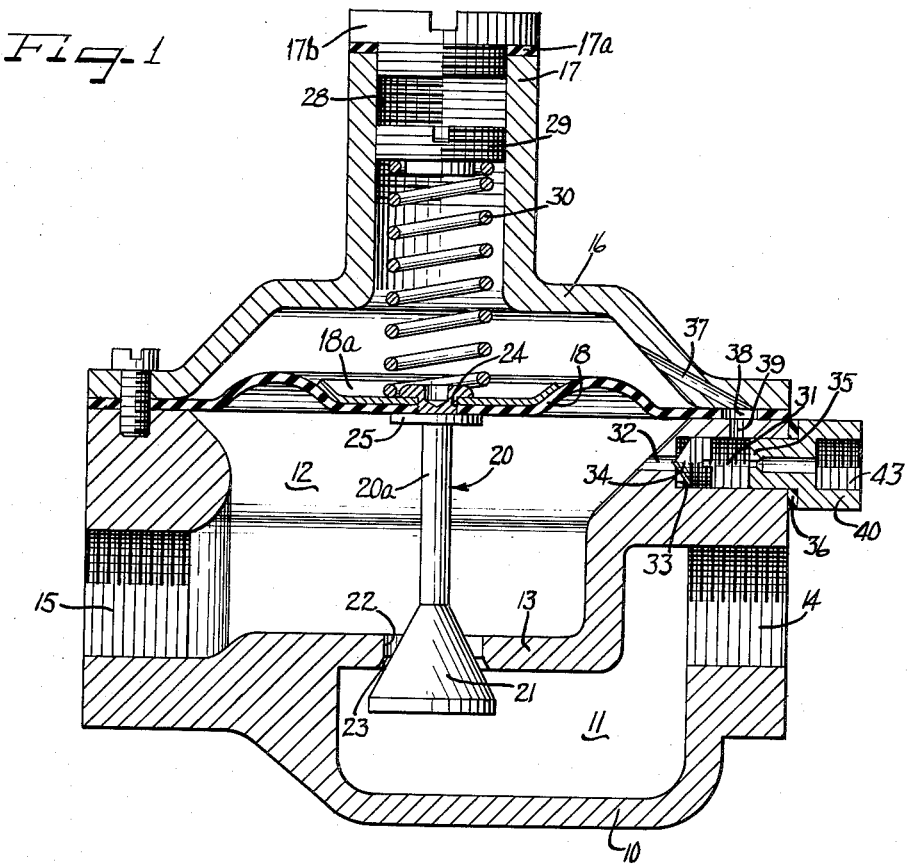

May 2, 1961

E. E. MODES 2,982,297

FLUID PRESSURE REGULATING VALVE

Filed May 15, 1958

Inventor
Edward E. Modes
Hill Sherman Meroni Gross & Simpson
by
Attys

United States Patent Office 2,982,297
Patented May 2, 1961

2,982,297
FLUID PRESSURE REGULATING VALVE
Edward E. Modes, Chicago, Ill., assignor to The Dole Valve Company, Morton Grove, Ill., a corporation of Illinois Filed May 15, 1958, Ser. No. 735,540
2 Claims. (Cl. 137—271)

This invention relates to fluid pressure regulating valves and more particularly to a control valve adapted to be utilized interchangeably with liquified petroleum and city supply gas systems.

As is well known in the art, pressure regulating valves used in conjunction with city supply gas systems are generally arranged to deliver gas to the point of consumption at a pressure of approximately three inches of water. It is, however, also well known that pressure regulating valves adapted to be used in conjunction with liquified petroleum gas systems must be designed to deliver gas to the point of consumption at a pressure of approximately eleven inches of water. In the past, pressure regulating gas valves were designed either to be utilized in conjunction with a liquified petroleum gas system or in conjunction with a city supply gas system but were not arranged to be utilized interchangeably with the two systems. Accordingly, when it was desired to convert from a city supply gas source to a liquified petroleum gas source, a plug or some other means was generally utilized to hold the valve member within the regulating valve in the open position with the consequent result that the valve operating pressure compensating diaphragm within the regulating valve was generally ruptured due to the relatively high gaseous pressures acting thereagainst so that, consequently, it was necessary to disassemble the regulating valve and install a new diaphragm before the regulating valve could be again used in conjunction with a city supply gas system.

Hence, in order to obviate the difficulties briefly outlined above, applicant has provided a fluid pressure regulating gas valve which may readily be converted for use with either a city supply gas system or a liquified petroleum gas system.

For illustration, but not by way of limitation, the pressure regulating valve of the present invention may be an integral part of a gas appliance and may be designed to reduce city gas supply pressure from six inches of water at the inlet to three inches of water at the point of consumption. If it should thereafter become desirable to connect the appliance to a source of liquified petroleum gas having its own regulator, applicant's valve may be rendered inoperative so that the pressure compensating diaphragm therein will not be damaged by the relatively high liquified petroleum gas pressures. Thereafter, if it should later become desirable to reconnect the appliance to a city gas supply system, the pressure regulating valve may readily be rendered operative again to maintain an outlet gas pressure of three inches of water at the point of consumption.

It is, therefore, a principal object of this invention to provide a fluid pressure regulating gas valve adapted to be rendered inoperative without damage thereto for use in conjunction with a liquified petroleum gas system which may thereafter readily be rendered operative again for use in conjunction with a city supply gas system.

It is a further object of this invention to provide a pressure regulating gas valve having a movable diaphragm therein for controlling fluid flow through a port in which the port controlling means may be maintained in the fully open position and in which the diaphragm may be protected from rupturing by equalizing the pressure on either side thereof.

It is still a further object of this invention to provide a pressure regulating gas valve which may readily be converted for use with a liquified petroleum or city supply gas system wherein no extra parts are required to so convert the valve and in which no disassemblage and reassemblage of the principal parts of the valve is necessary for the conversion.

It is another object of the present invention to provide a fluid pressure regulating gas valve of the type above described in which it may be readily visually ascertained whether the valve is adapted to be utilized in conjunction with a liquified petroleum gas supply system or a city supply gas system.

Figure 2:
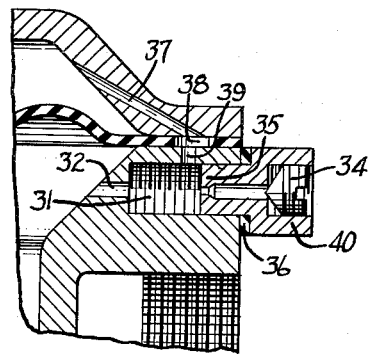

These and other objects of the invention will become apparent from time to time as the following specification proceeds and with reference to the accompanying drawnig, wherein:

Figure 1 is a vertical sectional view through a valve constructed in accordance with the principals of the present invention showing the valve adapted to be utilized in conjunction with a city supply gas system; and Figure 2 is a fragmentary vertical sectional view through the valve structure illustrated in Figure 1 but showing the valve adapted to be utilized in conjunction with a liquified petroleum gas supply system.

In the embodiment of the invention illustrated in the drawings there is shown a hollow valve body 10 having inlet and outlet chambers 11 and 12, respectively, formed therein by a partitioning wall 13 lying within the hollow valve body. The inlet chamber 11 is, arranged as indicated generally at 14, to be connected to a source of pressurized fluid and the outlet chamber 12 is similarly arranged, as at 15, to be connected to a point of utilization.

A cover plate 16 having a hollow boss 17 projecting therefrom is arranged to seal a flexible diaphragm 18 about the outer periphery thereof to the valve body 10. The cover plate 17, the flexible diaphragm 18, and the valve body 10 are, of course, so connected that a fluid tight seal is formed therebetween for reasons which will hereinafter become obvious.

A poppet valve 20 having a radially enlarged base portion 21 is arranged to regulate fluid flow through a port 22 in the partitioning wall 13. It will here be noted that the port 22 has a chamfered surface 23 around the edge thereof which is arranged to coact with the radially enlarged base portion 21 of the poppet valve 20 to completely seal off all fluid flow from the inlet chamber 11 to the outlet chamber 12.

It will now be noted that the stem 20a of the poppet valve 20 extends through a centrally located aperture 24 in the flexible diaphragm 18 and is there rigidly secured as by crimping or the like to an angular washer or stiffener 18a which lies on the upper surface of the central portion of the flexible diaphragm 18 for means of centrally stiffening the same as is well known in the art. A snap ring 25 in connected to the poppet valve stem 20a on the underside of the diaphragm 18 to firmly secure the valve stem to the diaphragm.

The hollow boss 17 is inwardly threaded as at 28 to receive a spring adjusting screw 29. A compression spring 30 guided within the hollow boss 17 is arranged to have one end seat against the stiffener 18a and to have its other end react against the spring adjusting screw 29. The upper end of the hollow boss 17 is sealed by means of a sealing ring 17a and an end cap 17b which is also threaded within the boss 17.

A vent chamber 31 is formed within the valve body 10 and opens to one side thereof, and is communicable with the outlet chamber 12 through a vent passage 32. An annular shoulder 33 at the inner end of the vent chamber 31 forms a seat for a seal screw plug 34 which may be threadably positioned within the vent chamber 31 to block fluid flow through the vent passage 32.

The spring chamber above the diaphragm 18 is communicable with vent chamber 31 through a diagonal vent passage 37, an aperture 38 in the periphery of diaphragm 18, and a connecting vent passage 39 which is formed in registry with passage 37 and aperture 38.

Thus, when the inlet 14 is connected to a varying pressure fluid source the device herein described will operate to maintain a substantially constant outlet pressure at some value below the inlet pressure. If we assume equilibrium pressure conditions at both the inlet and outlet 14 and 15, respectively, it may be seen that rises in inlet pressure flow through the valve port 22 will increase the pressure in the outlet chamber 12 which pressure will act to move the diaphragm 18, and consequently the poppet valve 20, in an upward direction to reduce the flow area through the port 22 and thus reduce the pressure within the outlet chamber 12 to substantially its initial value. Obviously, since the spring chamber is vented to the atmosphere through passages 37, 38 and 39, the force resisting upward movement of the diaphragm 18 can be accurately adjusted by merely varying the resistive force of spring 30. This may readily be accomplished merely by axially moving the spring adjusting screw 29 within the boss 17.

If, on the other hand, some resistance in the outlet is met causing a reduced pressure at the outlet and within the outlet chamber 12, the spring 30 will act to deflect the flexible diaphragm 18 and the poppet valve 20 downwardly to increase the flow area at the port 22 and raise the fluid pressure within the outlet chamber 12 and at the outlet 15.

The operating procedure of the valve described above, for regulating gaseous outlet pressure, is quite effective when utilized in a city supply gas system but, as has hereinbefore been explained, pressure regulating gas valves utilized in liquified petroleum gas systems must be arranged to deliver gas to the point of consumption at a pressure much greater than that required when used in a city supply gas system. In the past, pressure regulating valves designed for use in city supply gas systems were generally maintained in an inoperative position by means of placing a plug or spacer above the valve-operating diaphragm to maintain the regulatory valve means in an inoperative position when it was desired to utilize the valve in a liquified petroleum gas system. This method, although operative to maintain the valve in an open position at all times, resulted in an application of full inlet line pressure to one side of the diaphragm. The gaseous pressure acting on only one side of the flexible diaphragm was, however, liable to rupture the diaphragm allowing gas to escape to the atmosphere. Furthermore, rupture of the diaphragm made the valve structure inoperable to later be connected to a city gas supply line unless the valve structure was disassembled and the flexible diaphragm was replaced.

Consequently, applicant has devised a novel means for readily converting the fluid pressure regulating valve for a use with both city and LP gas. This novel means eliminates the possibility of a ruptured diaphragm. The open end of the vent chamber 31 is threaded to receive the hollow stem 35 of a vent plug 40 which is sealed in fluid tight relation with the valve body 10 by means of a sealing ring 36. The vent plug 40 has an enlarged diameter head portion which has an inwardly threaded passage 43 formed therein communicating with the hollow passage within the stem 35 of the vent plug 40 which has the same inner diameter as the vent chamber 31 for reasons which will hereinafter become obvious.

It may now clearly be seen that in order to convert the valve structure arranged to be used in connection with a city gas supply line to a valve structure adapted to be used in connection with a source of liquified petroleum gas or the like, it is only necessary to remove the vent plug 40, remove the seal screw plug 34, replace the vent plug, and thread the seal screw plug within the threaded passageway 43 of the vent plug 40 as is shown in Figure 2. The foregoing procedure serves to communicate the chambers on each side of the annular diaphragm 18 with one another through passages 32, 31, 39, 38 and 37 and seals the chambers both above and below the diaphragm 18 from the atmosphere. Hence, with equalized pressure on either side of the diaphragm 18 the net fluid force acting on the diaphragm is zero and the spring 30 will operate to maintain the poppet valve 20 in a fully open position at all times with respect to the port 22.

It will herein be understood that this embodiment of the invention has been used for illustrative purposes only and that various modifications and variations of the present invention may be effected without departing from the spirit and scope of the novel concepts thereof.

I claim as my invention:

1. A fluid control valve comprising a valve body having an inlet, an outlet, and a port communicating said inlet with said outlet, a movable wall positioned within said valve body on the outlet side of said port and movable in one direction by the force of pressurized fluid on the outlet side of said port, valve means cooperable with said port and connected to and moved by said movable wall, means biasing said movable wall in a second direction to urge said valve means to open said port, a vent chamber, first and second vent passages venting the spaces on opposite sides of said movable wall to said vent chamber, a hollow vent plug removably mounted within said vent chamber for communicating said chamber with the atmosphere, and a seal plug positionable within said vent chamber to close communication between the space on the outlet side of said movable wall and said vent chamber in which plug position the space above said movable wall is in communication with the atmosphere or positionable within said hollow vent plug to open communication between the spaces on opposite sides of said movable wall while closing communication of those spaces with the atmosphere.

2. A pressure regulating device including a hollow valve structure having an inlet and an outlet, a partitioning wall between said inlet and said outlet, a port in said partitioning wall, a flexible diaphragm having its outer periphery sealed to the walls of said valve structure on the outlet side of said partitioning wall, a poppet valve operatively connected to said diaphragm and cooperable with said port to regulate fluid flow therethrough, means biasing said diaphragm and said valve in a port opening direction and fluid pressure means operable to move said diaphragm and said poppet valve in a direction to close said port, a vent chamber having threaded inner walls, a vent passage venting the space above said diaphragm to said vent chamber, a second vent passage venting the space below said diaphragm to said vent chamber, a hollow vent plug threadedly mounted in said vent chamber for communicating the interior of said vent chamber with the atmosphere, and a seal plug positionable within said vent chamber to close communication between the space below said diaphragm and said vent chamber in which plug position the space above the diaphragm is in communication with the atmosphere or positionable within said hollow vent plug to open communication between the spaces above and below said diaphragm while closing communication between the spaces above and below the diaphragm with the atmosphere.

References Cited in the file of this patent

UNITED STATES PATENTS

| | | |
|---|---|---|
| 625,325 | Craig | May 23, 1899 |
| 2,047,101 | Grove | July 7, 1936 |
| 2,270,304 | Jacobsson | Jan. 20, 1942 |
| 2,436,451 | Rosenberger | Feb. 24, 1948 |
| 2,715,416 | McKinley | Aug. 16, 1955 |